United States Patent [19]

Goto

[11] Patent Number: 5,016,034
[45] Date of Patent: May 14, 1991

[54] CAMERA SYSTEM

[75] Inventor: Tetsuro Goto, Funabashi, Japan

[73] Assignee: Nikon Corporation, Tokyo, Japan

[21] Appl. No.: 580,179

[22] Filed: Sep. 10, 1990

[30] Foreign Application Priority Data

Sep. 13, 1989 [JP] Japan .................................. 1-235520

[51] Int. Cl.$^5$ ............................................ G03B 17/02
[52] U.S. Cl. ............................. 354/288; 354/289.12; 354/295
[58] Field of Search ................ 354/412, 289.1, 289.11, 354/289.12, 288, 295, 212, 214, 21, 286, 471, 474, 475

[56] References Cited

U.S. PATENT DOCUMENTS 4,710,008 12/1987 Tosaka et al. ...................... 354/289.1
4,952,959 8/1990 Taniguchi et al. ............. 354/289.12
4,958,181 9/1990 Ishikawa et al. ..................... 354/412

Primary Examiner—L. T. Hix
Assistant Examiner—Le Nguyen
Attorney, Agent, or Firm—Shapiro and Shapiro

[57] ABSTRACT

In a camera system of the present invention, two kinds of units which set picture factors for a camera, such as shutter speed and ISO value, can be selectively attached to the camera: one type mechanically sets the picture factors in a continuous operation; and the other type electrically sets the picture factors in a button operation. According to the above-mentioned composition, the camera system can be used as what is called a mechanical camera and as what is called a button type camera by exchanging the units. Thus, the camera system of the present invention can answer needs of a wide range.

13 Claims, 10 Drawing Sheets

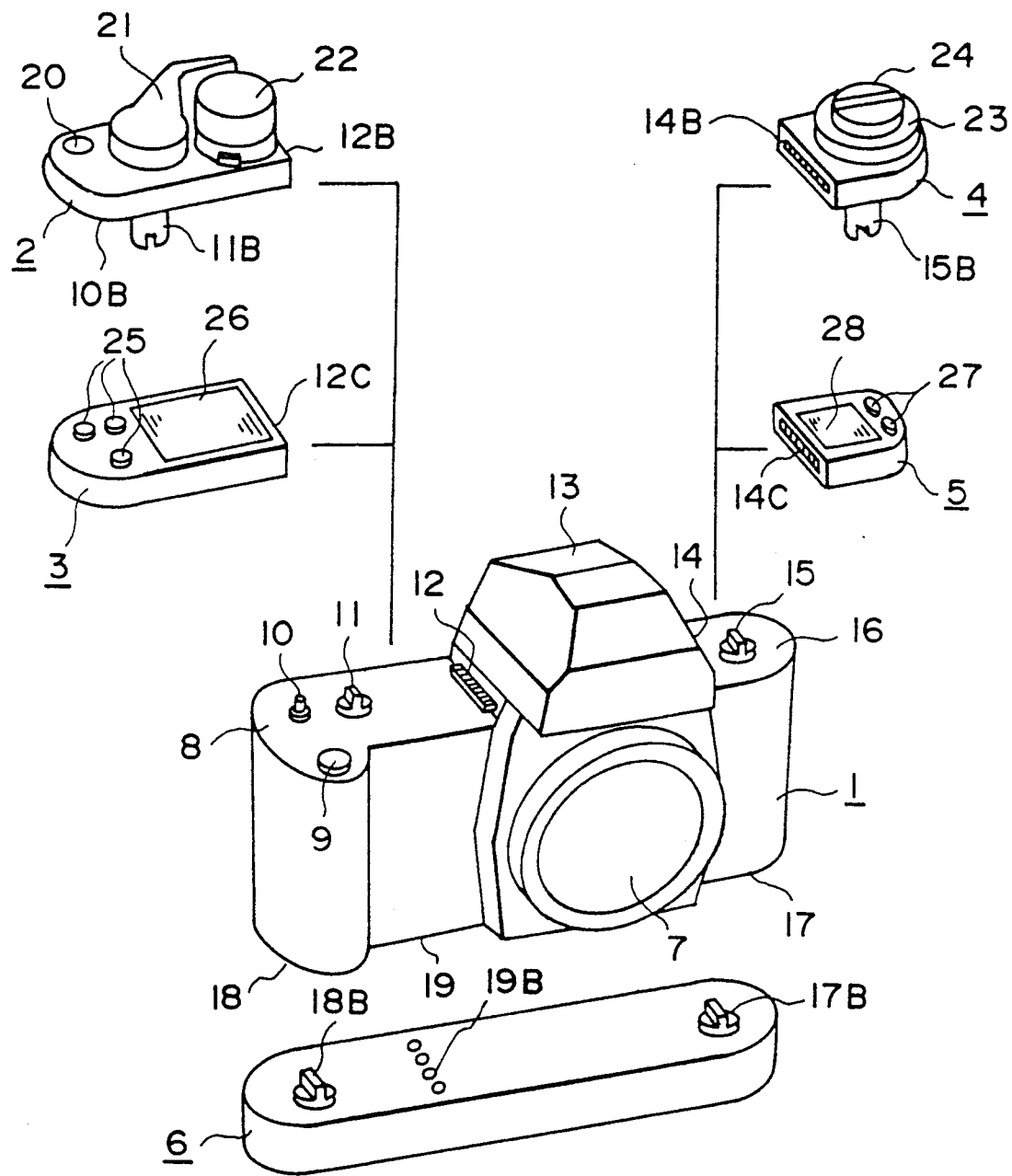
F I G. 1

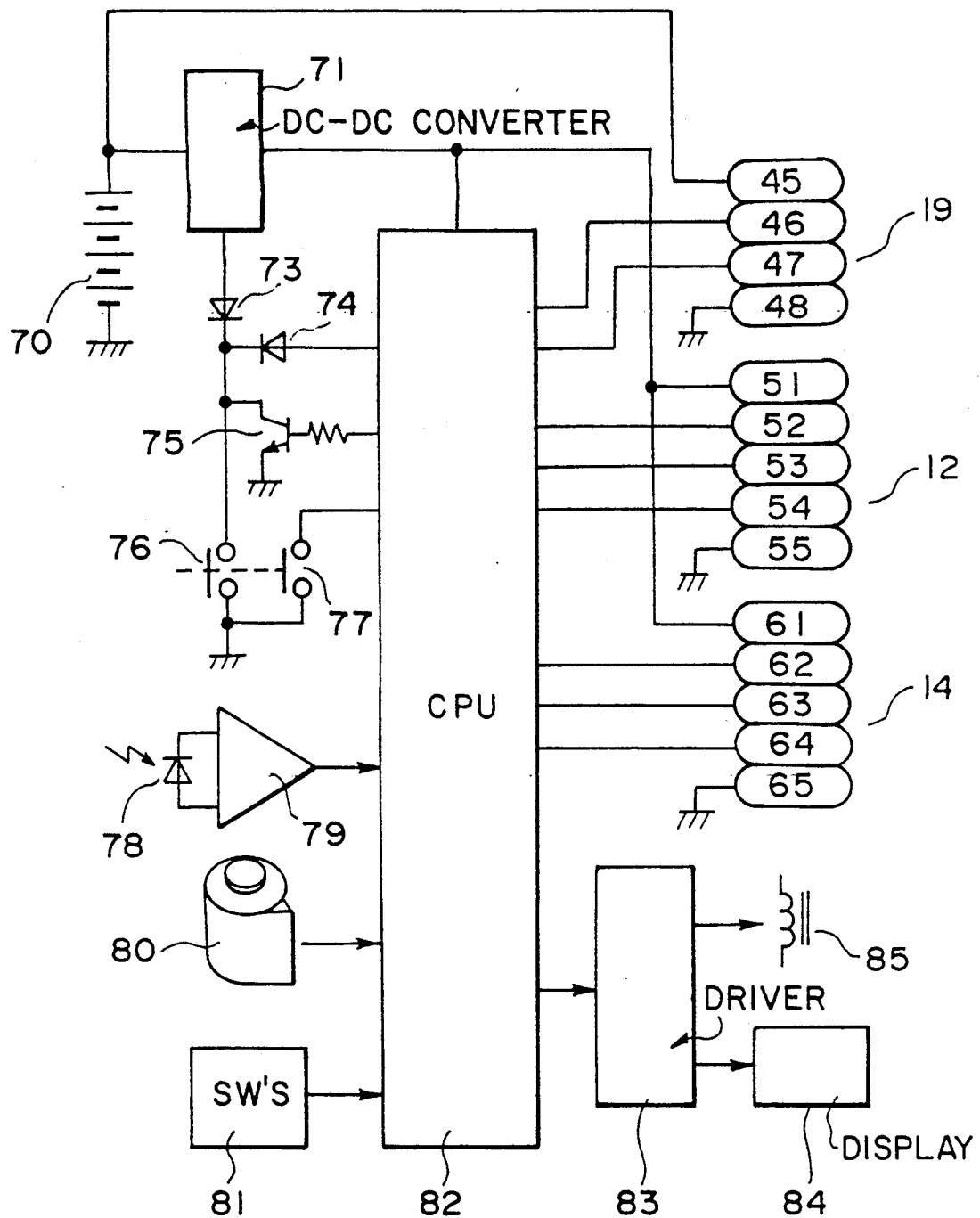
F I G. 6

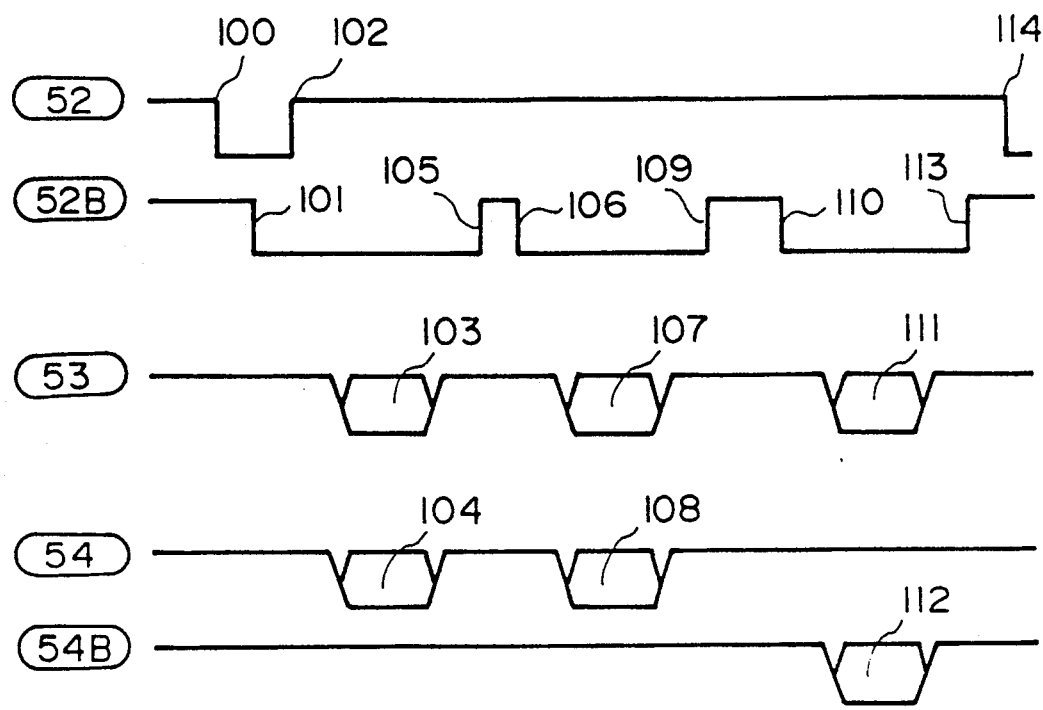
F I G. 7
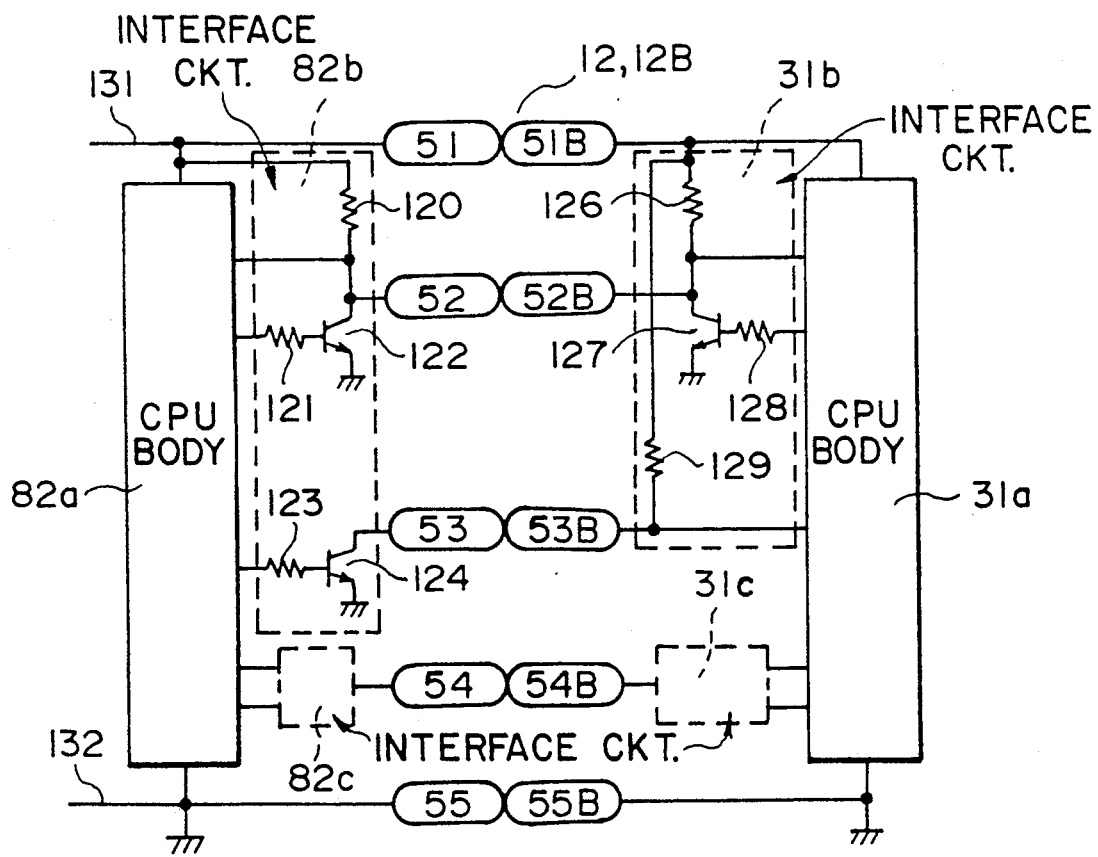
F I G. 8

5,016,034

CAMERA SYSTEM

BACKGROUND OF THE INVENTION

1. Field of the Invention

The present invention relates to a camera and to an operation unit thereof.

2. Related Background Art

Operation devices for setting picture factors and so on in a conventional camera are of the following two types:

The first type is called a "mechanical camera" mainly intended for professional photographers. In such a mechanical camera, an operation device mounted in the camera for setting picture factors is generally a rotary dial whose position is continuously changed. The mechanical camera has advantages of being capable of quickly conducting various setting operations, of recognizing set conditions, such as picture factors, at a glance, and so on.

On the other hand, what is called a "button operation camera" is mainly intended for general users and sets picture factors and so on by manipulating a button. Such a button operation camera is excellent in the sense that various picture functions can be provided without making the camera itself big. This is true because the only devices which are necessary outside the camera are a mechanism for detecting on/off of an electrical contact and a display for displaying set values. Therefore, the button operation camera is superior to the mechanical camera in the categories of view of price and the number of specifications (functions capable of being set).

However, the above conventional cameras have the following problems.

The button operation camera mainly used by general photographers has sufficient specifications. However, as the photographer becomes skilled in taking pictures, the following problems arise: since a picture factor cannot be set in one operation, it is difficult to quickly take a picture, and since many functions are usually not used, the photographer has a feeling that the camera is overly expensive. Therefore, when the photographer is skilled, the necessity of buying the above mechanical camera is likely to arise, which is the disadvantage of the button operation camera.

On the contrary, a professional photographer must sometimes take photographs out of the specification range of the mechanical camera. In such a case, it is necessary to add the above-mentioned button operation camera.

SUMMARY OF THE INVENTION

An object of the present invention is to provide a camera which both professional and amateur photographers can conveniently use. A further object of the present invention is to provide a camera which can answer every need, for example, of an amateur photographer who becomes more skilled and whose needs for camera operability change.

In order to solve the above problems, the following can be selectively mounted on a camera according to the present invention: mechanical operation units (2 and 4) having operation members (22 and 23) capable of being continuously shifted by an outside operation and unit-side connecting means (12B and 14B) for outputting information relative to picture factors corresponding to the position of the operation members, switch operation units (3 and 5) having setting members (25 and 27) for allowing an outside switching operation and display portions (26 and 28) capable of displaying information relative to picture factors corresponding to the operation of the setting members; and unit-side connecting means (12C and 14C) for outputting information relative to picture factors corresponding to the operation of the setting members. Furthermore, the camera comprises electrical connecting means (12 and 14) for transmitting information and exposure control means (82 and 162). The electrical connecting means can be connected to each of the connecting means of both units (12B, 12C, 14B and 14C). In case in which the mechanical operation units are attached to the camera, information relative to picture factors from the unit is input to the exposure control means through the electrical connecting means. On the other hand, in the case in which the switch operation units are attached to the camera, information relative to picture factors from the units is input to the exposure means through the electrical connecting means.

The camera having the above composition can be used as both what is called a mechanical camera having an operation member capable of being continuously and mechanically operated, and what is called a button operation camera having a setting member of a switch type. In other words, the camera of the present invention can be used as a mechanical camera or as a button operation camera by exchanging only the units having various functions.

Specifically, a professional photographer usually attaches mechanical operation units having a function of realizing a mechanical camera, such as blocks 2 and 4, to a camera and can replace the mechanical operation units with switch operation units, whose operability is inferior but which have more functions, as the need arises.

A general user usually uses button operation units, that is, blocks 3 and 5, and can replace the units with the mechanical operation units for the mechanical camera when he becomes skilled and decides his own policy of photography.

In each case, there is the advantage of freely changing the character of the camera by buying only a comparatively low-priced unit instead of buying a camera body in a conventional manner.

BRIEF DESCRIPTION OF THE DRAWINGS

FIG. 1 is a system view of a camera of the present invention;

FIG. 6 is a circuit diagram of the camera;

FIG. 7 is a time chart for serial communication;

FIG. 8 is a view specifically showing the connection of the circuits shown in FIGS. 2 to 6;

DETAILED DESCRIPTION OF THE PREFERRED EMBODIMENTS

Figure 2:
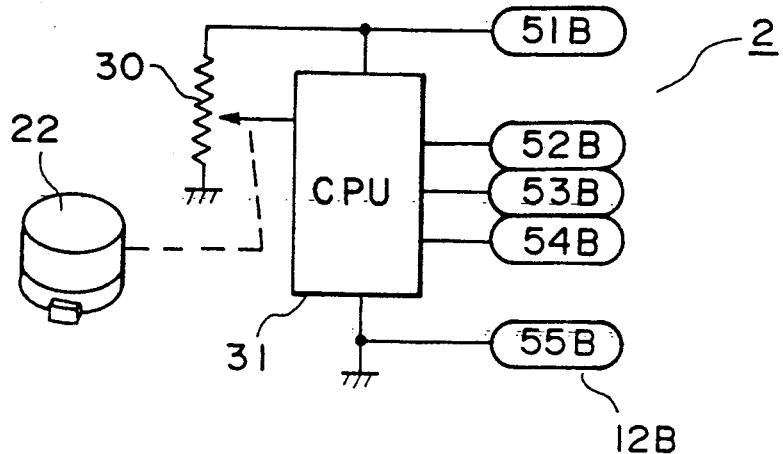
FIG. 2 is a circuit diagram of a winding unit of a mechanical operation type.

FIG. 1 is shows the composition of a camera system of a first embodiment according to the present invention.

Either of two kinds of winding blocks 2 and 3 is attachable to an upper winding side 8 of a camera 1, and either of two kinds of rewinding blocks 4 and 5 is attachable to an upper rewinding side 16. Furthermore, a motor block 6 can be attached to the bottom of the camera 1. The winding blocks 2 and 3 set modes relative to operation for the winding of a film and picture factors, such as shutter time, and the rewinding blocks 4 and 5 set modes relative to the rewinding of a film and picture factors, such as sensitivity of the film. Furthermore, the motor block 6 performs winding and rewinding operations of the film by a built-in motor.

The camera 1 has a lens mount 7, to which an unillustrated lens is attached on the front side thereof, a shutter button 9, a first connector 12 as an electrical connecting means, a winding bearing shaft 11 and a number system shaft 10 on the upper winding side 8. On the upper rewinding side 16, a second connector 14 as an electrical connecting means and a rewinding bearing 15 are provided. Furthermore, a motor winding shaft 18, a group of contacts 19 and a motor rewinding shaft 17 are mounted at the bottom of the camera 1.

Operations are performed as follows:

The case in which the winding block 2 is attached as a mechanical operation unit will now be described. In the winding block 2, when a winding operation is performed by manually operating a winding lever 21, a winding shaft 11B rotates and transmits the rotational force to the winding bearing shaft 11 so as to wind a film up. At this time, the number system shaft 10 on the side of the camera 1 is also rotated, which rotates a number system bearing shaft 10B and feeds a film number display panel displayed in a number system window 20 frame by frame. Furthermore, shutter time as one of picture factors is printed on the upper plane of a shutter dial 22. Information relative to the shutter time of the shutter dial 22 which is set by manually rotating the shutter dial 22 is transmitted into the camera 1 through the unit-side connecting means, that is, a connector 12B and the first connector 12. These operations correspond to operations of a conventional mechanical camera.

The case in which the winding block 3 as a switch operation unit is attached will be next described. The winding block 3 is not mechanically connected to the camera 1, and the winding bearing shaft 11 and the number system shaft 10 on the side of the camera 1 do not perform any operation in this case. When the photographer presses setting members, that is, a group of buttons 25, while watching a display portion composed of a LCD or the like, that is, a display window 26, the shutter time information selected by the operation is transmitted to the camera 1 through a unit-side connecting means, that is, a connector 12C and the first connector 12. These operations correspond to operations of a conventional button type camera.

Now, the case in which the rewinding block 4 is attached as another mechanical operation unit will be described. The sensitivity of the film can be set by manually setting one of sensitivity values printed around an operation member, that is a sensitivity setting dial 23, and the information is transmitted to the side of the camera 1 through a unit-side connecting means, that is, a connector 14B and the second connector 14. The film can be rewound by rotating a rewinding crank 24 and transmitting the rotation of a rewinding shaft 15B to the rewinding bearing shaft 15 of the camera 1. The above operation method corresponds to that of a conventional mechanical camera.

Operations in the case in which the rewinding block 5 is attached as another switch operation unit are as follows: When the photographer manually operates the setting means, that is, a group of buttons 27 while watching a display portion, that is, a display window 28, the setting of the film sensitivity, the rewinding of the film, and so on are commanded. The commands are transmitted to the camera 1 through the unit-side connecting means, that is, a connector 14C and the second connector 14.

If the winding block 3 or the rewinding block 5 is used, since the manual winding or rewinding operation is impossible, it is necessary to attach the motor block 6 and electrically perform either or both of the winding and rewinding operations. Furthermore, when the block 3 or 5 is used, if the block 6 is not attached, it is necessary to give a warning by using some means. Although the motor block 6 is detachable to the camera 1 in this embodiment, the motor block 6 and the camera 1 may be made as a unit as described below.

The command signal of winding or rewinding is transmitted from the camera 1 through a group of contacts 19 and 19B, and the winding operation is performed through a motor winding shaft 18B and the motor winding bearing shaft 18 and the rewinding operation is performed through a rewinding shaft 17B and the rewinding shaft 17 by the motor block 6.

FIG. 2 is an embodiment of a circuit diagram of the winding block 2 shown in FIG. 1.

The connector 12B is, as shown in FIG. 2, composed of five terminals: a terminal 51B for a power supply, terminals 52B to 54B for transmitting signals and a terminal 55B as a ground terminal. The rotation of the shutter dial 22 shifts a slider of a resistor 30 having variable resistance. The resistor 30 is connected between the supply terminal 51B and the ground terminal 55B and the slider removes the potential at an optional point therebetween. Resistance value (that is, voltage) information representing the shutter time selected based on the position of the dial 22 is transmitted to a CPU 31 and converted from analog to digital. Then, the digitized information is transmitted to the camera 1 by the above signal transmitting terminals 52B to 54B. The signal transmitting terminals 52B to 54B are operated in a wellknown serial communication method.

Figure 3:
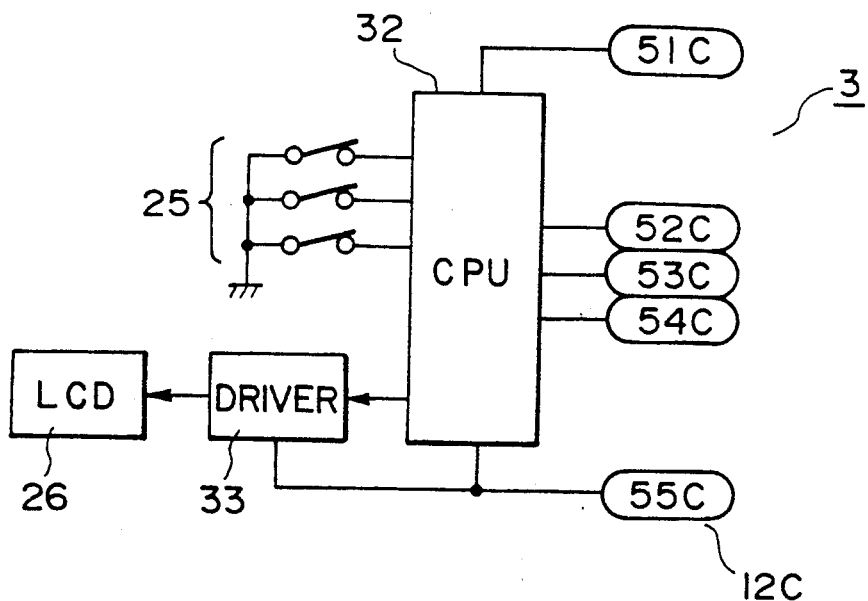
FIG. 3 is a circuit diagram of a winding unit of a switch operation type.

FIG. 3 shows an embodiment of a circuit of the winding block 3 shown in FIG. 1.

Terminals 51C to 55C of the connector 12C respectively have the same functions as those of the terminals 51B to 55B shown in FIG. 2. A plurality of setting buttons 25 which are connected to a CPU 32 are used to select modes, and increase and decrease the shutter speed. In other words, the CPU 32 recognizes a predetermined shutter speed in accordance with the operation of the button 25. A driver 33 controls the LCD 26 according to signals representing shutter speed and so on generated from the CPU 32. By appropriately pressing the buttons 25 while watching the display situation of the LCD 26, necessary information can be set. The set information is transmitted to the camera 1 by the CPU 32 through the above mentioned terminals 52C to 54C.

Figure 4:
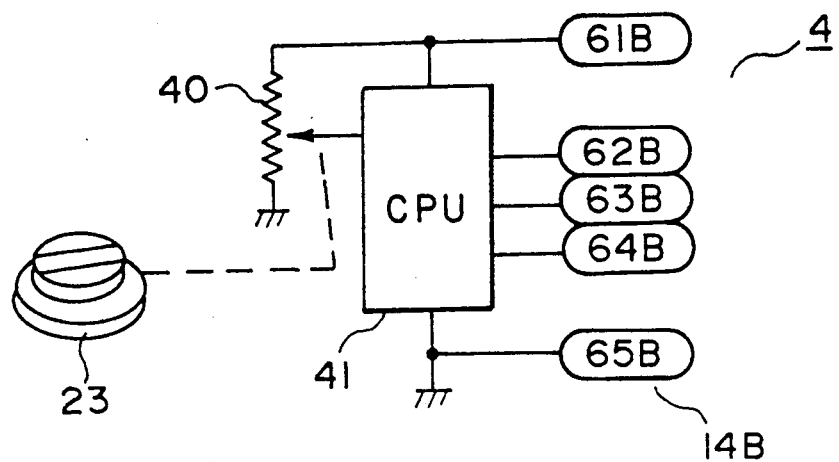
FIG. 4 is a circuit diagram of a rewinding unit of a mechanical operation type.

FIG. 4 shows an embodiment of a circuit of the rewinding block 4 shown in FIG. 1.

The connector 14B has functions equivalent to those of the connectors in the above winding blocks 2 and 3. The rotating operation of the film sensitivity setting dial 23 is performed in the same manner as that of the shutter dial 22 shown in FIG. 2 and corresponds to the movement of a slider of a resistor 40. The resistance information, that is, the voltage information, is converted from analog to digital in a CPU 41 and transmitted as information relative to the film sensitivity to the camera 1 through terminals 62B to 64B.

Figure 5:
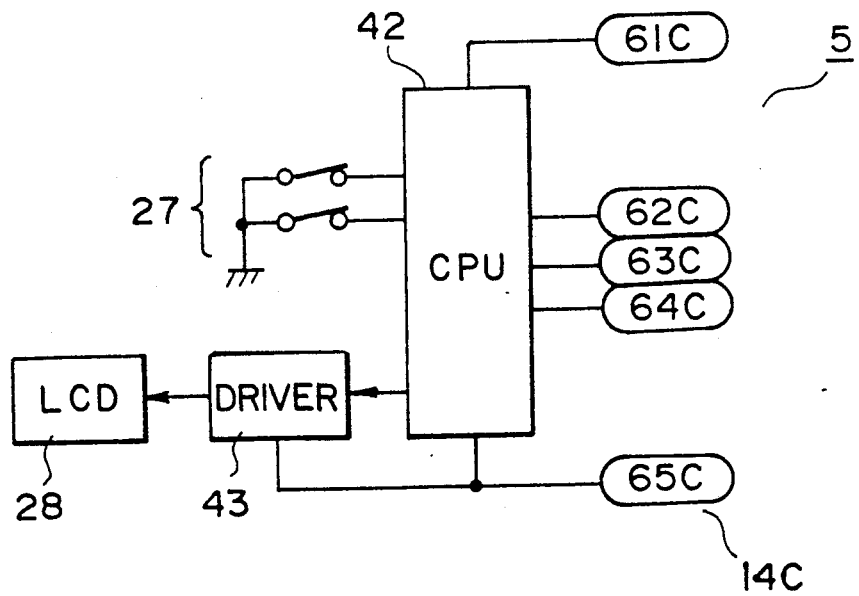
FIG. 5 is a circuit diagram of a rewinding unit of a switch operation type.

FIG. 5 shows an embodiment of a circuit of the rewinding block 5 shown in FIG. 1.

The circuit has the same composition as that of the winding block 3 shown in FIG. 3. Signals from a CPU 42 are transmitted to a driver 43. By operating an up button and a down button 27 while watching the information displayed on the LCD 28, it is possible to set modes, such as film sensitivity.

FIG. 6 shows an embodiment of a circuit built in the camera 1.

A battery 70 is connected to a DC-DC converter 71 and a terminal 45 of the connector 19. The DC-DC converter 71 is activated by operating a half-press switch 76 through a diode 73 or by turning a transistor 75 on through the diode 73. The half-press switch 76 is, like a release switch 77, a switch to be turned on or off in accordance with the degree to which the shutter button 9 is pressed. The output of the DC-DC converter 71 is connected to an internal circuit, such as a CPU 82, and to terminals 51 and 61 of the connector 12 and 14.

As for the connector 19, a winding signal is output from the CPU 82 to a terminal 46 and a rewinding signal is output to a terminal 47. A terminal 48 is a ground terminal. As the connector 12, signals for serial communication are transmitted from the CPU 82 to terminals 52, 53 and 54. A terminal 55 is a ground terminal. Similarly, in case of the connector 14, terminals 62, 63 and 64 are provided for serial communication and a terminal 65 is provided as a ground terminal. The terminals 51 to 55 are connected to the terminals 51B to 55B or the terminals 51C to 55C of the above-mentioned blocks. The terminals 61 to 65 are connected to the terminals 61B to 65B or the terminals 61C to 65C of the above-mentioned blocks.

An amplifier 79 amplifies a subject luminance signal from a light receiving element 78 and transmits it to the CPU 82.

The CPU 82 detects the sensitivity of a film 80 printed as a DX signal on a film cartridge. The relationship between the DX signal and the film sensitivity set by the above rewinding block 4 and the like is as follows: the setting of the setting dial 23 includes a selecting of whether or not an automatic setting is to be performed, as well as a manual setting of a value of the film sensitivity. If the automatic setting is to be performed, the detected DX value code of the film 80 is input as it is.

Furthermore, a group of switches 81 are mounted to transmit the timing and so on relative to each sequence of the camera 1 to the CPU 82.

When the half-press switch 76 is turned on, the DC-DC converter 71 is activated and starts to supply electricity to the circuit. The CPU 82 controls the transistor 75 so that the DC-DC converter 71 continues to operate for a fixed period after the half-press switch 76 is turned off.

When the release switch 77 is turned on, an activation signal from the CPU 82 is transmitted to the driver 83, so that various kinds of magnets 85 are driven to perform an exposure operation. The exposure condition can be visually recognized in a finder or the like by means of a display element 84 through the driver 83.

FIG. 7 explains a serial communication function between the camera 1 and the winding block 2 in detail. Although the description of the communication between the camera 1 and the other blocks 3, 4 and 5 is omitted, it is performed in the same manner as that of the camera 1 and the winding block 2.

In this embodiment, it is assumed that 2-byte information from the camera 1 and 1-byte information from the winding block 2 are transferred.

What is called a handshake function between the terminals 52 and 52B is first started. At the point 100, the CPU 82 of the camera 1 sets a L level. When the CPU 31 in the winding block 2 detects this change of level, it sets a L level at the point 101. Furthermore, when the CPU 82 recognizes this response, it returns the level to a H level at the point 102. The conditions for communication between the CPUs 82 and 31 are prepared during the course of the above process up to the last step mentioned above. Then, a clock signal 103 is transmitted from the CPU 82 to the winding block 2 through the terminal 53, and the first byte data 104 is simultaneously transferred from the camera 1 to the winding block 2. When the transfer of the first byte data 104 is completed, the CPU 31 returns the terminal 52B to a H level at the point 105, sets the terminal 52B to a L level again at the point 106 after the data is stored, and requests the next data to be transferred. The CPU 82 transfers a clock signal 107 and the second byte data 108 again.

When the data transfer is completed, the CPU 31 returns the terminal 52B to a H level again at the point 109. As a result, 2-byte data 108 is transferred from the camera 1 to the winding block 2.

Subsequently, the sequence in which data is reversely transferred from the winding block 2 to the camera 1 is alternatively started. The CPU 31 sets the terminal 52B on a L level at the point 110, and then transfers data 112 to the camera 1 in synchronization with the generation of a clock signal 111 from the CPU 82.

In the above case, the information from the CPU 31 of the winding block 2 is set shutter time information and the information from the CPU 82 of the camera 1 is a data request command. The data may be freely omitted or added in accordance with the amount thereof and signals may be transferred in one direction. In the case of the communication between the winding block 3, which is a switch operation unit, and the camera 1, much information is displayed on the LCD 26, and therefore, it is sometimes required to communicate data other than the data 104 and 108.

FIG. 8 is a circuit diagram showing an embodiment of a serial communication portion between the camera 1 and the winding block 2.

A supply line 131 is connected to a CPU body 82a and to a CPU body 31a through the terminals 51 and 51B. Furthermore, the supply line 131 pulls up resistors 120 and 126. A ground line 132 makes the CPU bodies 31a and 82a the same in potential at the terminals 55 and 55B. Mounted between the CPU body 82a and the terminals 51, 52 and 53 is an interface circuit 82b. The CPU body 82a drives transistors 122 and 124 through resistors 121 and 123. Signals from the transistors 122 and 124 are transmitted through the terminals 52 and 52B to each port of the CPU body 31a connected to resistors 126 and 129. On the other hand, the CPU body 31a drives a transistor 127 through a resistor 128 and transmits signals to a port connected to the resistor 120 in the interface circuit 82b. The resistors 126, 128 and 129 and the transistor 127 constitute an interface circuit 31b on the side of the winding unit. As described above, the terminals 52 and 52B are bidirectional transfer lines and the terminals 53 and 53B are one-directional transfer lines. Although the terminals 54 and 54B are data lines, since interface circuits 82c and 31c thereof are the same as parts of the interface circuits 82b and 31b relative to the terminals 52 and 52B, a description of the interface circuits 82c and 31c is omitted.

Figure 9:
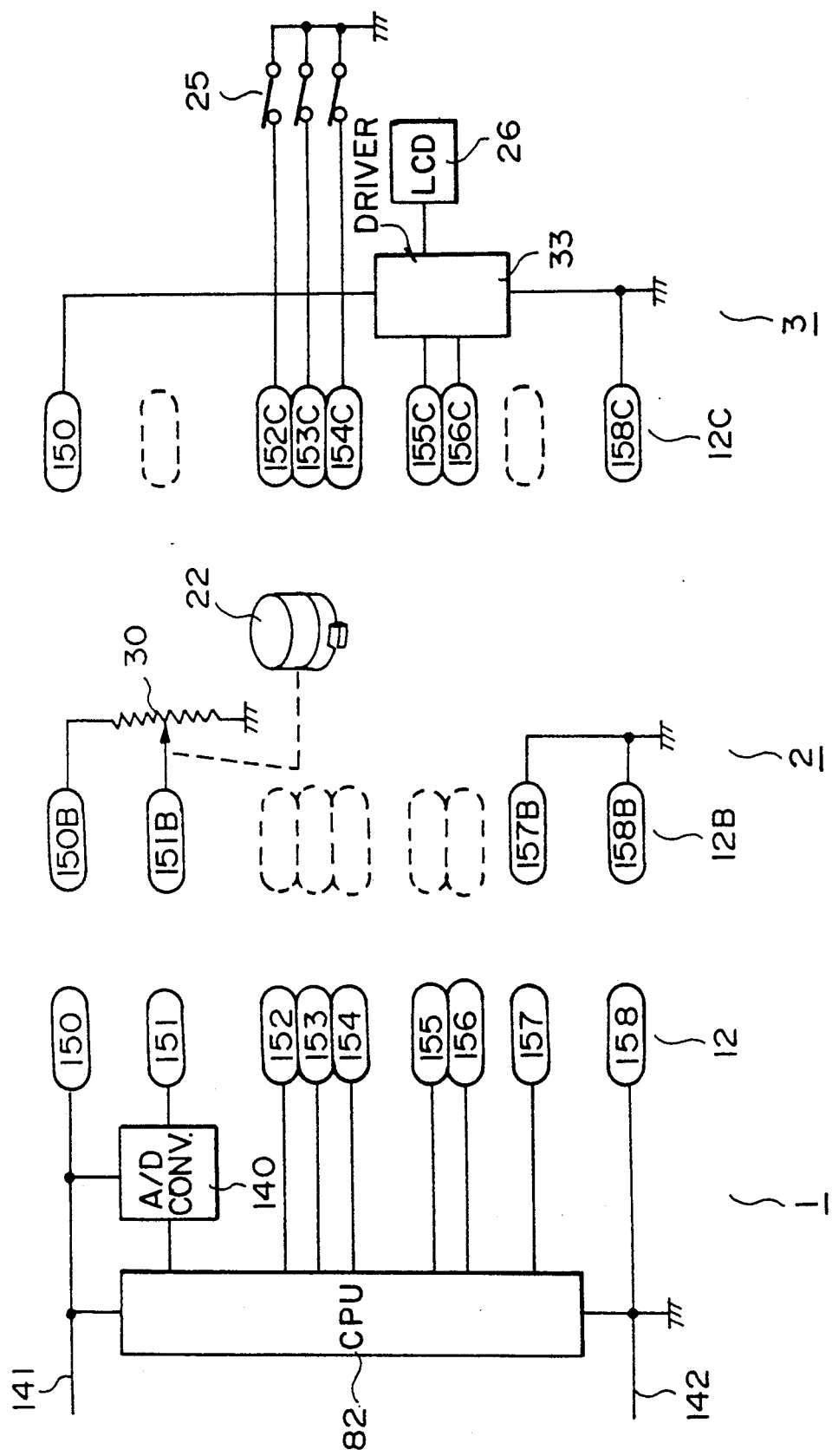
FIG. 9 is a view showing the composition of a circuit built in a camera of a second embodiment.

FIG. 9 shows a second embodiment.

In the second embodiment, since the outward arrangement of the camera, the winding block and so on are the same as that in the embodiment shown in FIG. 1, only the arrangement of circuits in the camera and winding block will be described. The camera 1 is provided with the CPU 82 and an AD converter 140, which converts signals applied to a terminal 151 to digital signals and transfers the signals to the CPU 82. A supply line 141 supplies electricity to the CPU 82, the AD converter 140 and also to winding blocks 2 and 3 through a terminal 150. Terminals 152 to 154 detect whether each of the group of switches 25 is on or off when the block 3 is attached to the camera 1. Terminals 155 and 156 are serial signal terminals.

Operations in the case in which the mechanical operation winding block 2 is attached to the camera 1 will be described below.

A grounded terminal 157B is mounted in the winding block 2 and used to identify the block. (The terminal of the switch operation winding block 3, mentioned below, corresponding to the terminal 157B, is not grounded.) The CPU 82 first checks the potential of a terminal 157. Since, if the terminal 157 is on a L level, it is judged that the winding block 2 is attached, the AD converter 140 is allowed to activate and the terminals 152 to 156 are not used. The position setting of the shutter dial 22 divides the voltage between a power supply 150B and the ground by moving a slider of the resistor 30, and the set value is transmitted to the CPU 82 through the terminals 151B and 151 and the AD converter 140.

On the other hand, in the case in which the winding block 3 is attached, since it is judged that the terminal 157 is in an open state, the AD converter 140 is prohibited from operating and the state of the group of switches 25 applied to the terminals 152 to 154 is recognized. Based on the set information of the state of the group of switches 25, display information is transferred to the driver 33 through the terminals 155 and 156.

Figure 10:
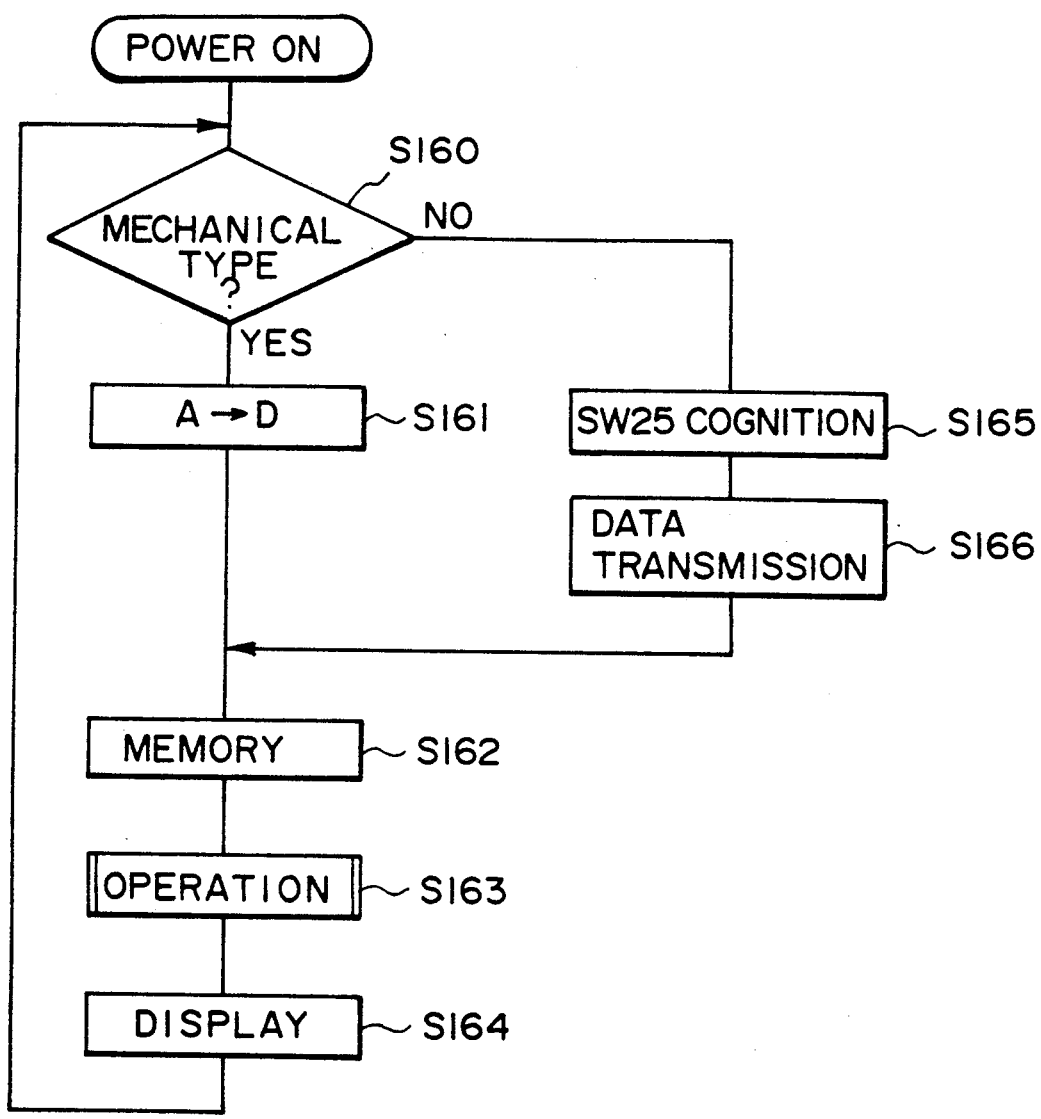
FIG. 10 is a flowchart of the circuit.

FIG. 10 shows an embodiment of a flowchart relative to operations of the CPU 82 shown in FIG. 9.

The routine shown in FIG. 9 is started in response to the turning on of the power supply and the attached winding block is identified in Step S160. This identification corresponds to the judging of the voltage level of the above terminal 157. When it is judged that the winding block 2, which is a mechanical operation unit, is attached, the voltage level is converted from analog to digital in the next Step S161. The A/D converted value is stored in Step S162 and a well-known exposure operation is executed in Step S163. The exposure information is displayed on a display member in Step S164 as the need arises. On the other hand, if it is judged in Step S160 that the winding block 3 is attached as a switch operation unit, the setting state of the group of switches 25 is recognized based on the potential of the terminals 152 to 154 in step S165, the data, such as shutter speed, is transmitted in Step S166 and displayed through the driver 33. The subsequent process is the same as above. The second embodiment is characterized in that the CPUs 31, 32, 41 and 42 in the winding and rewinding blocks in the first embodiment are unnecessary and that the set value can be detected in real time.

Figure 11:
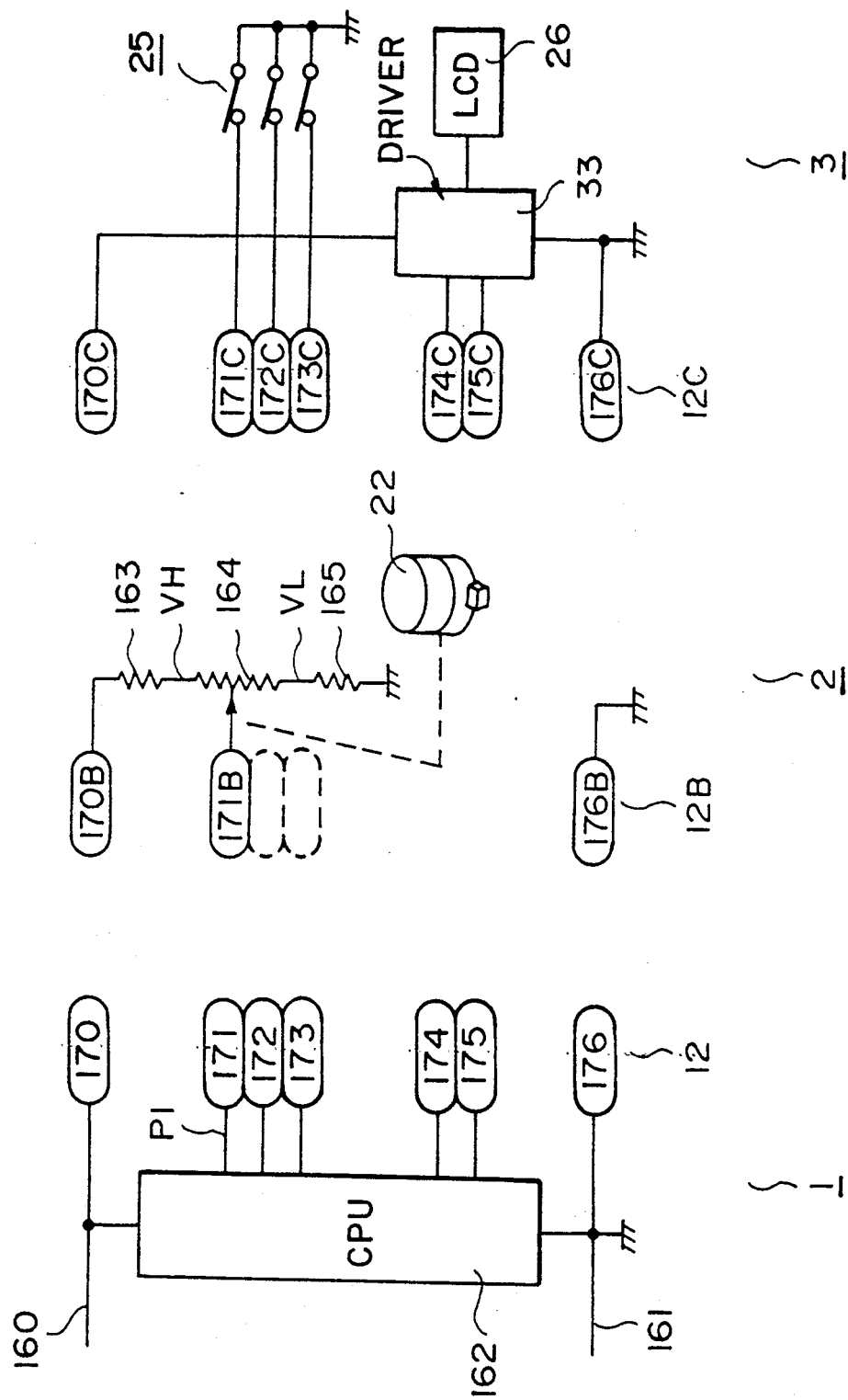
FIG. 11 is a view showing the composition of a circuit built in a camera of a third embodiment.

FIG. 11 shows a third embodiment.

In the third embodiment, since the outward arrangement of the camera and so on is the same as that in the first embodiment, only the arrangement of the circuits in the winding block and the camera will be described. A supply line 160 and a ground line 161 of the camera 1 are connected, as shown in the figure, to terminals 170 and 176 of the connector 12 besides to a CPU 162. Each port of the CPU 162 is connected to terminals 171 to 175.

A port P1 connected to the terminal 171 has a function of AD conversion. In the circuit in the winding block 2, the rotation of the shutter dial 22 moves a slider of a resistor 164 in the same manner as above. However, this embodiment is different from the above embodiment in that resistors 163 and 165 are connected to the supply side and the ground side of the resistor 164 respectively. Therefore, the voltage of the slider is designed not to be outside the range of VL to VH shown in the figure.

Operations in the case in which such a winding block 2 is attached to the camera 1 are as follows: First, the potential of the terminal 171, that is, the value of P1 is identified. Specifically, it is sufficient if the voltage of the port P1 is judged to be between VH and VL. Then, the value of the port P1 is converted from analog to digital and the set shutter time is stored. In this case, terminals 172 and 173 are ignored.

Operations in the case in which the winding block 3 is attached will now be described. As described above, the voltage of the terminal 171, that is, of the port P1 is checked. Since any of the group of switches 25 is, as shown in the figure, connected to the terminal 171, either the supply voltage or the ground appears in the potential of the port P1. When this is certified, the CPU judges that the winding block 3 is attached and detects the setting state of the group of switches 25 while transferring signals to the driver 33 through terminals 174, 175, 174B and 175B so as to drive the LCD 26.

Figure 12:
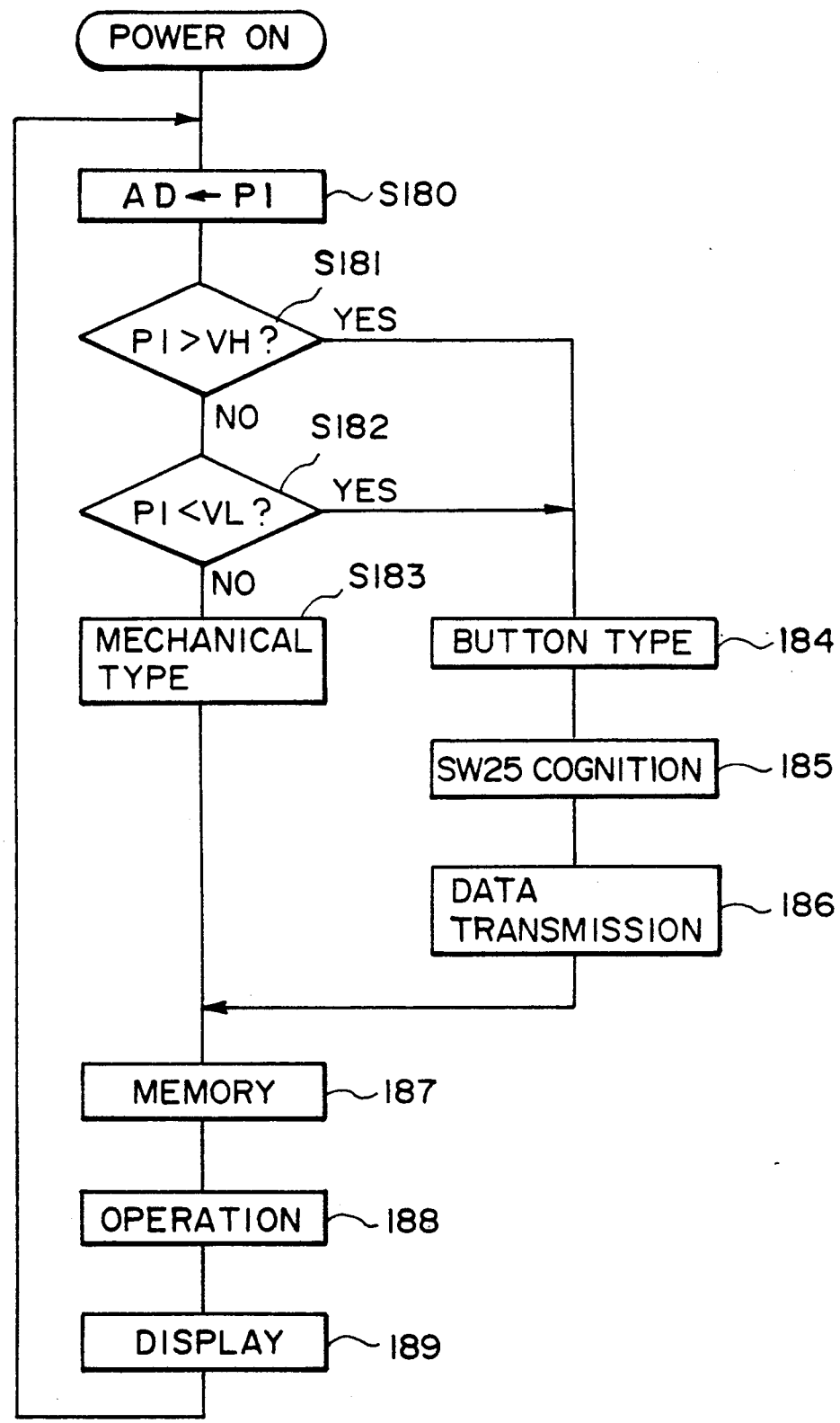
FIG. 12 is a flowchart of the circuit.

The flowchart of the above operations is shown in FIG. 12.

When the power is turned on, this routine is started, and the value of the port P1 is converted from analog to digital in Step S180. Then, it is judged in Step S181 whether or not the value is higher than VH. If the value is not higher, it is judged in Step S182 whether or not the value is lower than VL. If the value is not lower, it is judged in Step S183 that the attached block is of a mechanical type. The subsequent routine is the same as that shown in FIG. 10. On the other hand, if the value is higher than VH in Step S181 or if the value is lower than VL in Step S182, it is judged in Step S184 that the block is of a button type, and the same process as that shown in FIG. 10 is executed. (Steps S185, S186, S187, S188 and S189 respectively correspond to Steps S165, S166, S162, S163 and S164 shown in FIG. 10.) Thus, in the third embodiment, it is possible to make the number of terminals as connecting means smaller than that of the second embodiment.

Figure 13:
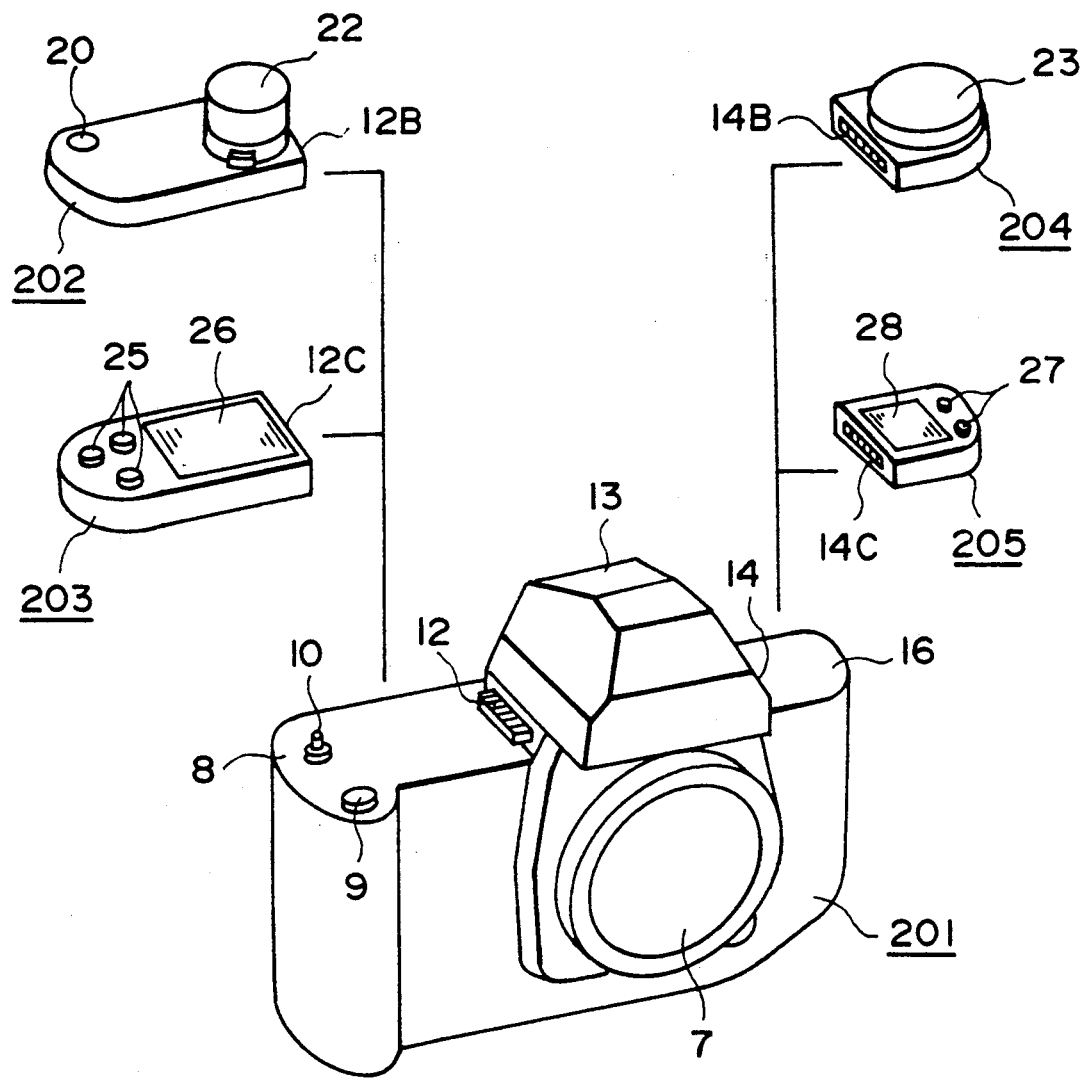
FIG. 13 is a view of a camera of a fourth embodiment.

FIG. 13 shows a camera of a fourth embodiment. A camera 201 shown in the figure contains the motor block 6, which is used while attached to the camera 1 shown in FIG. 1, therein.

Since the motor block 6 is built-in, the members related to the winding shaft 18, the rewinding shaft 17 and so on are not provided. Therefore, the members including the winding lever 21 in the block 2 are not used in a winding block 202, and the members related to the rewinding level 24 in the block 4 are not used in a rewinding block 204. A winding block 203 and a rewinding block 205 has the same mechanism as that of the blocks 3 and 5 shown in FIG. 1, and the arrangement of the circuits therein are the same as those shown in FIGS. 2 to 5 and 9 to 12.

I claim:

1. A camera system, comprising:
   a mechanical operation unit having an operation member capable of being continuously shifted by an outside operation and first unit-side connecting means for outputting information relative to picture factors corresponding to the position of said operation member;
   a switch operation unit having a setting member for allowing an outside switching operation and second unit-side connecting means for outputting information relative to picture factors corresponding to the operation of said setting member; and
   a camera body to which either said mechanical operation unit or said switch operation unit is selectively attachable, said camera body having electrical connecting means for transmitting information connectable to both of said unit-side connecting means of said mechanical operation unit and said switch operation unit and exposure control means to which the information relative to picture factors is input from said mechanical operation unit or said switch operation unit being attached.

2. A camera system as claimed in claim 1, wherein said mechanical operation unit comprises a variable resistor for outputting voltage corresponding to the position of said operation member, said resistor is connected to said unit-side connecting means, and said exposure control means detects the value of voltage output from said variable resistor through said electrical connecting means, calculates picture factors based on said detected voltage value when said detected voltage value is within a predetermined range, and judges that said mechanical operation unit is not attached when said detected voltage value is out of the predetermined range.

3. A camera system, comprising:
   a first setting device for providing and storing information to set picture factors of a camera, said information being mechanically stored;
   a second setting device for providing information to set picture factors of said camera;
   memory means for storing the information set by said second setting device, the information being electrically stored; and
   a camera body to which said first setting device or said second setting device is selectively attachable.

4. A camera system as claimed in claim 3, wherein said memory means is mounted in said camera body.

5. A camera system as claimed in claim 3, wherein the setting by said first setting device is performed by manually and mechanically shifting a member for displaying a plurality of kinds of setting object information thereon, said second setting device comprises an electro-optical display device, and the setting by said second setting device is performed by manually operating means for generating digital signals.

6. A camera system as claimed in claim 4, wherein the setting by said first setting device is performed by manually and mechanically shifting a member for displaying a plurality of kinds of setting object information thereon, said second setting device comprises an electro-optical display device, and the setting by said second setting device is performed by manually operating means for generating digital signals.

7. A camera system, comprising:
   a first adaptor for setting the shutter time of a camera by mechanically shifting a member with a plurality of shutter time values directly printed thereon and for storing the set value based on the position of said member;
   a second adaptor comprising a display, which displays a set shutter time value, for changing the set shutter time value by operating a manual operation member;
   memory means for electrically storing the shutter time value set by said second adaptor; and
   a camera body to which said first adaptor or said second adaptor is selectively attachable.

8. A camera system as claimed in claim 7, wherein said first adaptor comprises first transmission means for transmitting the set information in analog signals by serial communication, said second adaptor comprises second transmission means for transmitting the set information in digital signals by serial communication, and said camera body comprises control means for inputting the set information from said first or second transmission means by serial communication and controlling picture factors of said camera.

9. A camera system as claimed in claim 7, wherein said first adaptor further comprises a manual member for winding and rewinding a film.

10. A camera system as claimed in claim 7, further comprising a third adaptor for electrically winding and rewinding a film when said second adaptor is used.

11. A camera system as claimed in claim 10, wherein said third adaptor is built in said camera body.

12. A camera system, comprising:
   a first adaptor for setting an ISO value of a camera by mechanically shifting a member with a plurality of ISO values directly printed thereon and for storing the set value based on the position of said member;
   a second adaptor comprising a display which displays the set ISO value of said camera thereon for changing the ISO value by operating a manual operation member;
   memory means for electrically storing the set ISO value set by said second adaptor; and
   a camera body to which said first or second adaptor is selectively attachable.

13. A camera system as claimed in claim 12, wherein said first adaptor comprises first transmission means for transmitting the set information in analog signals to said camera body by serial communication, said second adaptor comprises second transmission means for transmitting the set information in digital signals to said camera body by serial communication, and said camera body comprises control means for inputting the set information from said first or second transmission means by serial communication and controlling picture factors of said camera.

* * * * *